US006925524B2

United States Patent
Chow et al.

(12) United States Patent
(10) Patent No.: US 6,925,524 B2
(45) Date of Patent: Aug. 2, 2005

(54) ASSOCIATED CONTENT STORAGE SYSTEM

(75) Inventors: Nelson L. Chow, Mountain View, CA (US); David L. Amey, Los Angeles, CA (US); Paul Cheng, San Jose, CA (US)

(73) Assignee: Integrated Silicon Solution, Inc., Santa Clara, CA (US)

( * ) Notice: Subject to any disclaimer, the term of this patent is extended or adjusted under 35 U.S.C. 154(b) by 284 days.

(21) Appl. No.: 10/249,189

(22) Filed: Mar. 20, 2003

(65) Prior Publication Data

US 2004/0186972 A1 Sep. 23, 2004

(51) Int. Cl.⁷ .............................................. G06F 12/08
(52) U.S. Cl. ....................................................... 711/108
(58) Field of Search ................................ 711/108, 202

(56) References Cited

U.S. PATENT DOCUMENTS 6,665,788 B1 * 12/2003 Hughes ...................... 711/206
6,700,809 B1 * 3/2004 Ng et al. ...................... 365/49

* cited by examiner

Primary Examiner—Kevin L. Ellis
(74) Attorney, Agent, or Firm—Raymond E. Roberts; Intellectual Property Law Offices

(57) ABSTRACT

A relocation system to associatively search a database lookup table with a search key to addressably retrieve a corresponding associate content table record as a search result. The relocation system is implemented in search engine devices having associative memory (e.g., CAM) having one or more sections. The search engine devices employ relocation values when calculating addresses, one per section per device, with the relocation values optionally pre-calculated and stored in relocation registers. The search engine devices may be cascaded to construct a larger search engine. The search engine is typically used with a processor and addressable memory (e.g., RAM or ROM). In particular, the relocation system permits multiple databases to be concurrently stored and worked with in the associative and addressable memory.

20 Claims, 15 Drawing Sheets

Generalized method for searching

Database associated content placed into four quadrants

The Associate Content for Three
Databases Placed Adjacent and
Sequentially

| AC table (offset) | Device number (index) | Relocation register value |
|---|---|---|
| 124a | 0 | 0 0 0 0 0 0 0 0 0 0 0 0 0 0 0 0 |
|  | 1 | 0 0 0 0 0 0 0 0 0 0 0 0 0 0 0 1 |
|  | 2 | 0 0 0 0 0 0 0 0 0 0 0 0 0 0 1 0 |
|  | 3 | 0 0 0 0 0 0 0 0 0 0 0 0 0 0 1 1 |
| 124b | 0 | 0 0 0 0 0 0 0 0 0 0 0 0 0 1 0 0 |
|  | 1 | 0 0 0 0 0 0 0 0 0 0 0 0 1 0 0 0 |
|  | 2 | 0 0 0 0 0 0 0 0 0 0 0 0 1 1 0 0 |
|  | 3 | 0 0 0 0 0 0 0 0 0 0 0 1 0 0 0 0 |
| 124c | 0 | 0 0 0 0 0 0 0 0 0 0 0 1 0 1 0 0 |
|  | 1 | 0 0 0 0 0 0 0 0 0 1 0 0 1 0 0 |
|  | 2 | 0 0 0 0 0 0 0 0 0 1 1 0 1 0 0 |
|  | 3 | 0 0 0 0 0 0 0 0 1 0 0 0 1 0 0 |

FIG. 8

Cascade system using multiple associated content devices

Generalized method for searching

ASSOCIATED CONTENT STORAGE SYSTEM

BACKGROUND OF INVENTION

1. Technical Field

The present invention relates generally to static information storage and retrieval systems, and more particularly to combining associative memories, which are also referred to as content or tag memories, with addressable memories.

2. Background Art

Many modern systems require searching for information at very high speeds; hence hardware-based approaches are often employed. An increasingly common example of this, and the one primarily used herein, is searching in communications networks (e.g., in switches and routers). An increasing popular aid in this type of search is the content addressable memory (CAM), also know as associative or tag memory. The use of CAM can either supplant or compliment more traditional algorithmic-based search approaches.

Briefly, the task we seek to perform here can be characterized as using a search key to retrieve a search result from a database. In particular, this task can be bifurcated, with CAM used for one part and regular, address accessed memory used for the other. There is considerable variation in CAM related terminology, so we try to consistently use the following terms herein. A table of lookup values stored in CAM is a "lookup table," and its respective elements are "entries." A table of associate content (AC) stored in regular memory is an "AC table," and its respective elements are "records." Collectively, the entries in the lookup table and the records in the AC table are the database. A "search key" can be matched against the entries in the lookup table to produce a "match addresses," and this match address can then be used to retrieve a single record from the AC table. Specifically, that record becomes a "search result."

Due to their parallel lookup nature, a CAM can return a result in O(1) time, thereby obviating the need for recursive searches that would be required if using regular addressable memory. Each entry in the lookup table inherently has an ordinal address, ranging from binary 0 to binary N-1, where N is the total number of entries in the CAM. If more than one matching entry is found, the CAM employs a prioritization scheme whereby one is chosen and used as the match address.

For example, in a typical networking application a search key may be formed by aggregating information from the packet header and payload as a packet arrives in the router. The search key is then used for lookup in one or more lookup tables stored in the CAM. If any matches are found, the respective match addresses for the respective entries are used as the basis for content addresses to access records in the respective AC tables. Multiple databases can be accessed concurrently in this manner, with the records containing the specific actions that should then be applied to the packet (e.g., metering and shaping parameters, quality of service provisions, packet counting and billing actions, DSCP remarking, CPU actions, etc.).

By placing the associated content in regular type memory instead of in CAM type memory multiple benefits are achieved. For example, CAM is much more expensive than regular memory, so a considerable cost savings can be had. This also permits flexibly configuring the search engine, since the width of the associated content is now tied to the regular memory rather than to the width of the CAM. Separating address lookup and associated content retrieval is now ubiquitous in the communications and networking industries, forming the foundation of many lookup engines in present use.

FIG. 1 (background art) is a schematic diagram depicting a typical CAM-based search engine 10. A processor 12, a CAM 14, an address unit 16, and an AC memory device (here a random access memory, RAM 18) are the major components of the search engine 10 in this example. The processor 12 hosts the underlying application and controls the various memory related operations. Today, the processor 12 will often be an application specific integrated circuit (ASIC), as shown. The RAM 18 may be a static or dynamic type (SRAM or DRAM), and some applications even use read only memory (ROM).

The processor 12 is connected to the CAM 14 by a search bus 20. In turn, the CAM 14 is connected to the address unit 16 by a match bus 22, and the address unit 16 is connected to the RAM 18 by an address bus 24. Finally, the RAM 18 is connected back to the processor 12 by a result bus 26. In many cases the address unit 16 is simply omitted and the match bus 22 and the address bus 24 then are effectively the same. A match value produced by the CAM 14 then is a match address. In FIG. 1, however, the address unit 16 is shown to emphasize that the match value obtained may be altered to form an actual content address that is used.

In use, a database 28 is stored by storing a table of lookup values in the CAM 14 and a table of associate content is stored in the RAM 18. To search then the database 28, the processor 12 provides a search key to the CAM 14 via the search bus 20. The CAM 14 performs a parallel search of all of the entries in its lookup table. When a match is found, the CAM 14 provides a match value to the address unit 16 via the match bus 22. From this, the address unit 16 derives the content address that is used to access a single record in the AC table. Finally, the record accessed is returned to the processor 12, via the result bus 26, as the search result.

Existing CAM-based search engines, using generally the scheme just described, are fairly straightforward devices, each storing one database, with an output bus or port providing access to the address space of the database's associated content. This approach needs to adapt, however, because applications increasingly require more power and faster throughput.

A complication with the existing CAM approaches so far has, been cascading multiple devices to form a larger, but still a single, database. This requires that the associated content share the same address space across all of the devices, and there must be a way to differentiate between entries within the different devices in the cascade structure (e.g., the system must be able to distinguish between the fourth entry of one device from the fourth entry of every other device in the cascade structure). To handle this, existing CAM-based search engines provide extra input pins that allow bits be append to the front end of an address. So, for instance, if eight devices are cascaded together, the host device needs to drive three extra pins that represent the eight devices in the cascade.

An obvious problem with this is that it adds cost in the form of extra pins, circuit footprint, etc. This also adds additional overhead that the host device must handle every time a match is generated from the CAM-based search engine cascade structure. Consequentially, as structures are scaled up to support larger database sizes and more cascaded devices, the complexity and cost of handling the output associated content addressing scheme increases as well.

In addition, the next generation of CAM-based search devices need to be much more powerful and flexible than those available today. For instance, it is desirable to have a CAM-based search processor that is able to execute not just a single lookup per cycle, but multiple simultaneous lookups per cycle. Such a search processor needs the ability to store many database tables (more than the number of simultaneous lookups). And it needs to be able to dynamically chose which database tables should be searched in a given cycle, and which output lookup port the result should go out on (since it offers simultaneous lookups per cycle). Clearly the output addressing scheme for this will have to adapt accordingly, and be commensurate with the power and flexibility of these next generation devices.

SUMMARY OF INVENTION

Accordingly, it is an object of the present invention to provide flexible and powerful search processor based associated content relocation scheme.

Briefly, one preferred embodiment of the present invention is a search engine for storing entries in lookup tables where the entries are usable to access corresponding records in associate content tables stored in addressable memory. The search engine includes an associative memory able to store one or more of the lookup tables. A, provided search logic is able to receive and associatively match a search key against the entries of one of the lookup tables, to determine a match value when a match exists and that is possible. A provided address logic is able to calculate an address in the addressable memory for the record in the associate content table corresponding to the entry for which the match value is determined. The address logic is further able to define relocation values, one or more per associative memory, and add a relocation value for the associative memory for which a match value is determined to the match value when calculating the address.

Briefly, another preferred embodiment of the present invention is a system for database storage as a lookup table of entries and an associated content table of records. The system includes a processor suitable to provide a search key and receive a search result. One or more provided search engines are collectively able to store the lookup table. Each search engine has an associative memory having one or more sections, where each section defines an offset value and each search engine defines an index value. A provided addressable memory is able to addressably store the associate content table. The search engines each further are able to receive the search key, to associatively search the lookup table based on the search key, to determine a match value when a match exists and that is possible, and to calculate an address based on the match value, the offset value, and the index value. The addressable memory is further able to receive the address, to retrieve one of the records in the associate content table, and to communicate that record to the processor as the search result.

Briefly, another preferred embodiment of the present invention is a method for storing an entry usable to access a corresponding record stored in addressable memory. The method includes providing one or more associative memories each having one or more sections. More than one associative memory is present when each has only one section and more than one section is present when only one associative memory is provided. One associative memory is selected as a current associative memory and one section in the current associative memory is selected as a current section. A current relocation value is determined for the current section in the current associative memory. The entry at a location in the current section in the current associative memory is stored such that the location defines a match value. The sum of the match value and the current relocation value specifies an address suitable for storing the record in the addressable memory.

Briefly, yet another preferred embodiment of the present invention is a method for searching a lookup table with a search key to determine an address for a corresponding record stored in addressable memory. The lookup table contains a plurality of entries stored in one or more sections of one or more associative memories. Each of the sections defines an offset value and each of the associative memories defines an index value. The method includes associatively searching the sections in which the lookup table is stored with the search key such that a match value is obtained, when a match exists and that is possible. The address is then calculated based on the match value, the offset value for the section from which the match value was obtained, and the index value for the associative memory from which the match value was obtained.

An advantage of the present invention is that it facilitates high speed bifurcated database searching, wherein associative memory (e.g., CAM) is used for storing associatively searchable lookup tables and addressable memory (e.g., RAM or ROM) is used for storing addressably searchable associate content tables.

Another advantage of the invention is its flexible ability to cascaded search engine devices, yet maintain low pin count, component footprint, and host processor management burden.

And another advantage of the invention is its ability to execute multiple, simultaneous lookups per cycle. The invention permits storing many databases (i.e., more than a number of simultaneous lookups desired), dynamically choosing which database should be searched in a given cycle, choosing which output database should be searched, and properly locating the appropriate record for that database.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF DRAWINGS

The purposes and advantages of the present invention will be apparent from the following detailed description in conjunction with the appended figures of drawings in which:

FIG. 6a–c illustrate a suitable process for content address construction, wherein FIG. 6a shows details when a first lookup table is used to generate an address in a first AC table in the SRAM of FIG. 3, FIG. 6b shows details when a second lookup table is used to generate an address in a second AC table, and FIG. 6c shows details when a third lookup table is used to generate an address in a third AC table;

FIG. 8 is a table showing register contents suitable to achieve the storage arrangement depicted in FIG. 7;

In the various figures of the drawings, like references are used to denote like or similar elements or steps.

DETAILED DESCRIPTION

Figure 1:
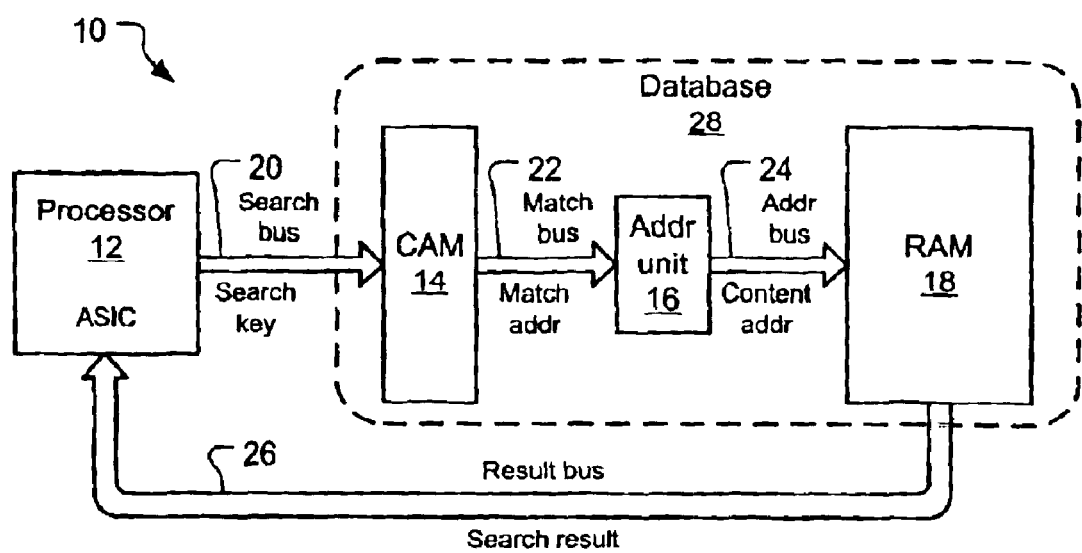
FIG. 1 (background art) is a schematic diagram depicting a typical content addressable memory (CAM) based search engine.

A preferred embodiment of the present invention is a search processor associated content relocation scheme. As illustrated in the various drawings herein, and particularly in the view of FIG. 3, preferred embodiments of the invention are depicted by the general reference character 100.

Briefly, the inventive relocation system 100 works as follows. A register within the internal register space of a content addressable memory (CAM) search engine is used to define a "relocation value." The relocation values are derived for specified sets of entries in the CAM (i.e., for portions of lookup tables for one or more databases). When a search is performed on a specified database, the relocation value is added to the match value that is generated, and used as a content address to access a record in the associate content (AC) table for the database.

Figure 2:
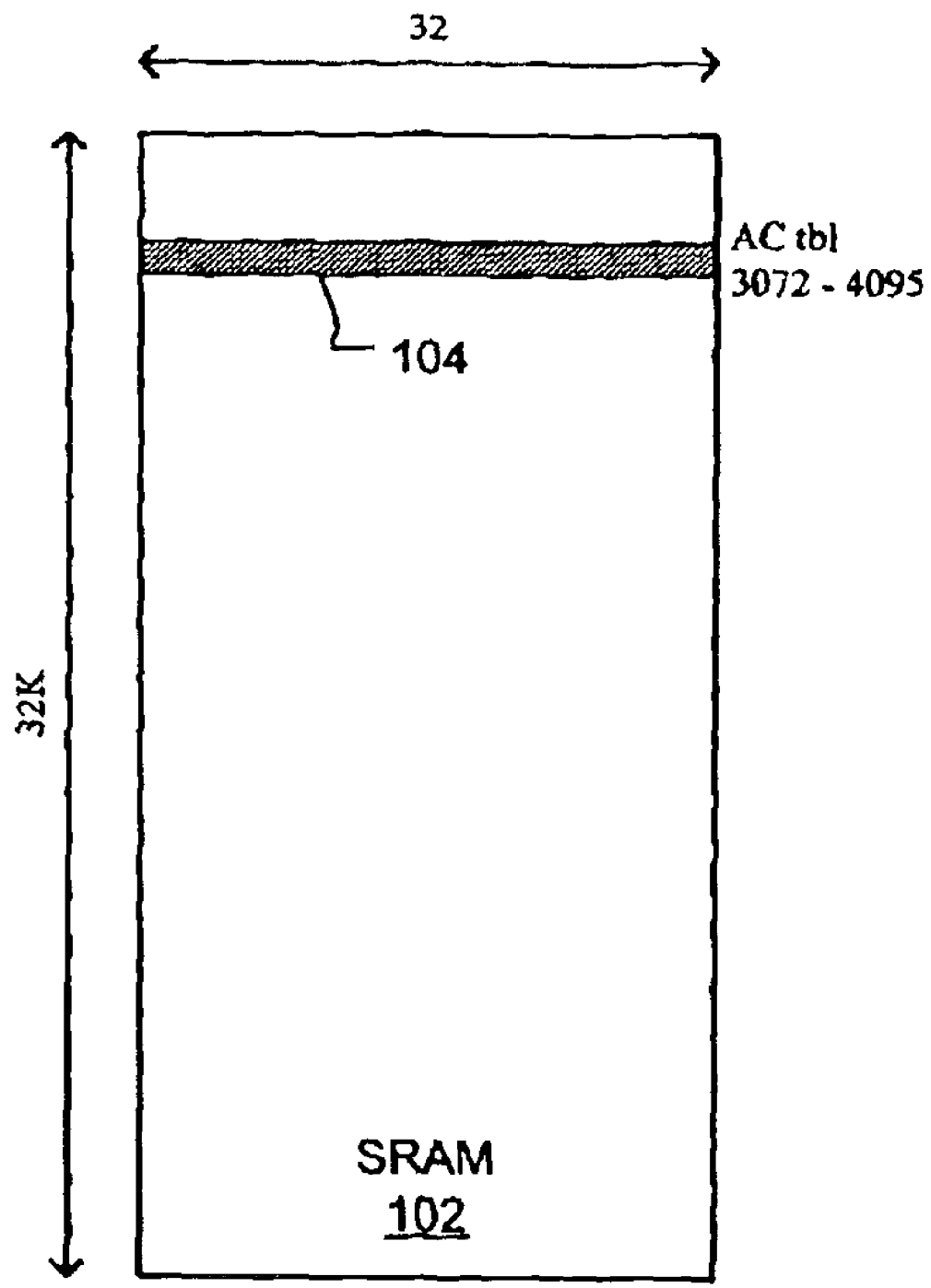
FIG. 2 is a block diagram that illustrates a basic concept of the invention.

FIG. 2 is a block diagram that illustrates a basic concept of the invention, before we discuss the relocation system 100 in detail. Much in the manner already discussed for FIG. 1 (background art), a database is stored partially in a CAM (not shown) and partially in a 1-Mbit (32K×32) SRAM 102. For this example, a 1K deep lookup table is provided in the CAM and an associate content table (AC table 104) is stored in part of the address space of the SRAM 102.

Based on its 1K address space, the CAM can provide a 10-bit "match value" indicating where in it a match occurs. The AC table 104 has a larger address space, however, wherein at least a 15-bit content address needs to be provided. Accordingly, in the relocation system 100 a relocation register (not shown) is used to convert the 10-bit match values to a wider output addresses by "adding" a relocation value to the respective 10-bit match values. The relocation values thus provide the most significant bits (MSB) and the match values provide the 10 least significant bits (LSB) of the output address.

In the examples herein we use 25-bit output addresses, even though the address space of the largest addressable memory discussed requires only an 18-bit wide content address. When an output address from the associative memory (i.e., the CAM) is wider than the content address needed to access the addressable memory (i.e., the RAM, ROM, etc. where the AC tables are stored), an appropriate number of bits in the output address can be omitted from the content address. This can be done by truncating the output address to remove unneeded MSBs or by selectively omitting bits so different content addresses are constructed to access different units of addressable memory, or both. Since one goal of the inventive relocation system 100 is flexibility, wide output addresses permit the use of a wide range of addressable memory sizes and arrangements to serve in different applications.

For the example in FIG. 2, the AC table 104 is located starting at address 3072 (3K) in the SRAM 102. Consequentially, the relocation value used should be at least "000000000000011" in order to successfully address the records in the AC table 104 here. The content address then can range from "110000000000"(3072) to "111111111111" (4095). Of course, this is a very simple example, one ignoring many lesser details to focus on the concept and not complicating matters with how the other 31K of the SRAM 102 may be used concurrently.

The concept described above will seem familiar to many skilled in the present art, since starting at address 3072 (3K) in the SRAM 102 resembles defining a base-address for the AC table 104. However, this starting concept can be extended in novel ways. First, we will consider a CAM-based search engine that contains several databases, each with respective lookup and AC tables. This example employs multiple cascaded search engine devices in which lookup tables are stored in associative memories (CAM) and AC tables are stored in a single addressable memory (SRAM). Next we will consider a variation with multiple search engine devices and a single addressable memory, where the addressable memory is more efficiently employed. After that, we consider an embodiment with multiple search engine devices and multiple addressable memories. Then we briefly consider embodiments with a single search engine device and a single addressable memory and with a single search engine device and multiple addressable memories.

Figure 3:
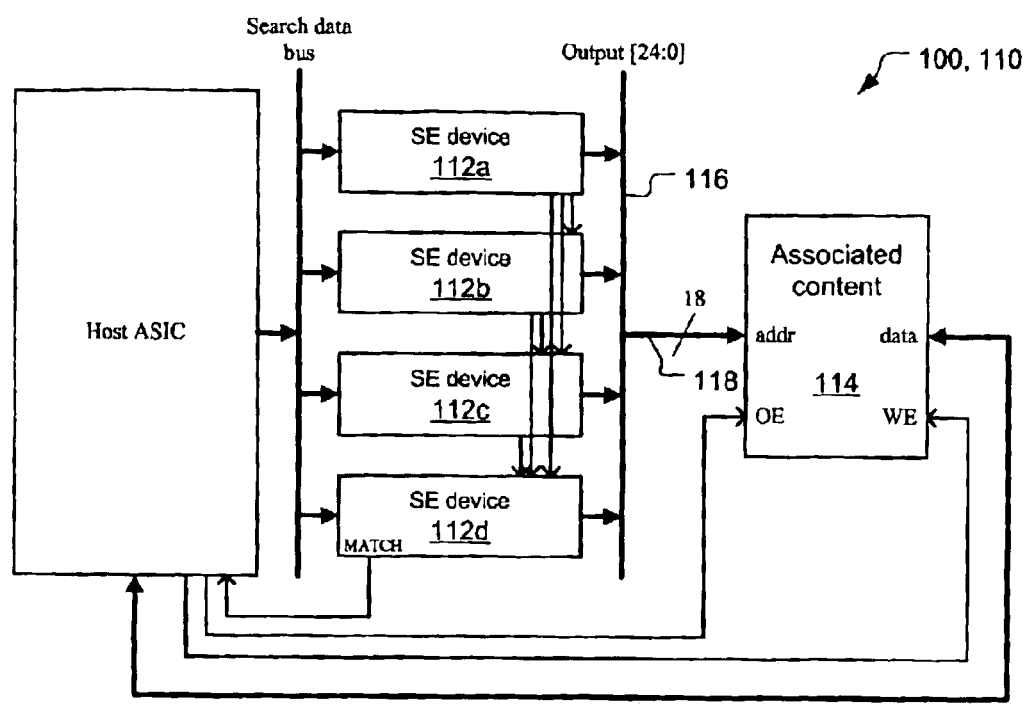
FIG. 3 is a schematic diagram showing a CAM-based search engine according to the inventive relocation system that contains several databases with records stored in a static random access memory (SRAM)

FIG. 3 is a schematic diagram showing the relocation system 100 in a single CAM-based search engine 110 that contains several databases. The search engine 110 includes four cascaded search engine devices (SE devices 112a–d) and a single 9-Mbit (256K×36) SRAM 114. The SE devices 112a–d connect with a common 25-bit wide output bus 116 and the SRAM 114 connects with an 18-bit wide address bus 118. The output bus 116 and the address bus 118 connect as well, and may largely be the same, with the lower 18 bits of the output bus 116 easily just becoming the address bus 118. The 25-bit width of the output bus 116 is a matter of design choice, while the 18-bit width of the address bus 118 is defined by the 256K addressable capacity of the SRAM 114.

Figure 4:
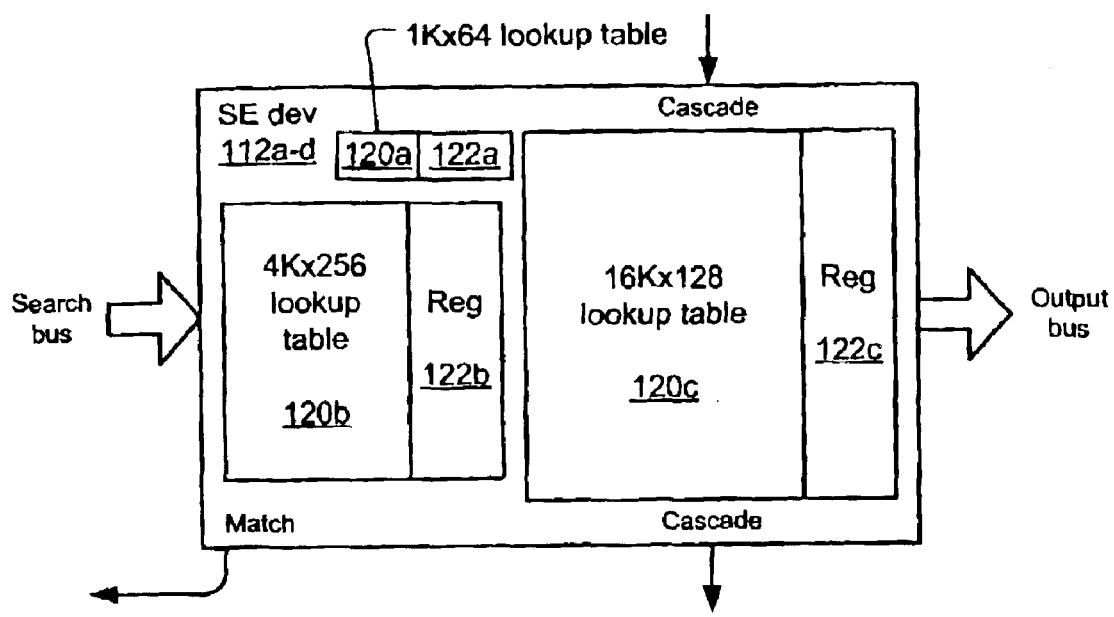
FIG. 4 is a schematic diagram stylistically showing the major elements of the SE devices, wherein each stores a part of three lookup tables in the CAM.

FIG. 4 is a schematic diagram stylistically showing the major elements of the SE devices 112a–d, wherein each stores a part of three lookup tables 120a–c in CAM type memory. Priority encoding and cascade logic have been omitted in FIG. 4 to emphasize the salient elements. The first lookup table 120a is 4K deep, with 1K of its entries stored in each of the respective SE devices 112a–d; the second lookup table 120b is 16K deep, with 4K of its entries also stored in each of the respective SE devices 112a–d; and the third lookup table 120c is 64K deep, with 16K of its entries further stored in each of the respective SE devices 112a–d. The SE devices 112a–d further have a set of relocation registers 122a–c. The relocation registers 122a–c are shown here integrated into the SE devices 112a–d, closely with the lookup tables 120a–c, but this is not a requirement.

Since the first lookup table 120a has 1K of entries stored in each of the SE devices 112a–d, it follows that at least 10 bits (10-bit match values) are needed to represent the entries stored in the respective 1K address spaces used. The second lookup table 120b has 4K of entries stored in each of the SE devices 112a–d, so it follows that at least 12 bits (12-bit match values) are needed to represent entries stored in these respective 4K address spaces. And the third lookup table 120c has 16K of entries in each of the SE devices 112a–d, so at least 14 bits (14-bit match values) are needed to represent entries in these 16K address spaces.

Figure 5:
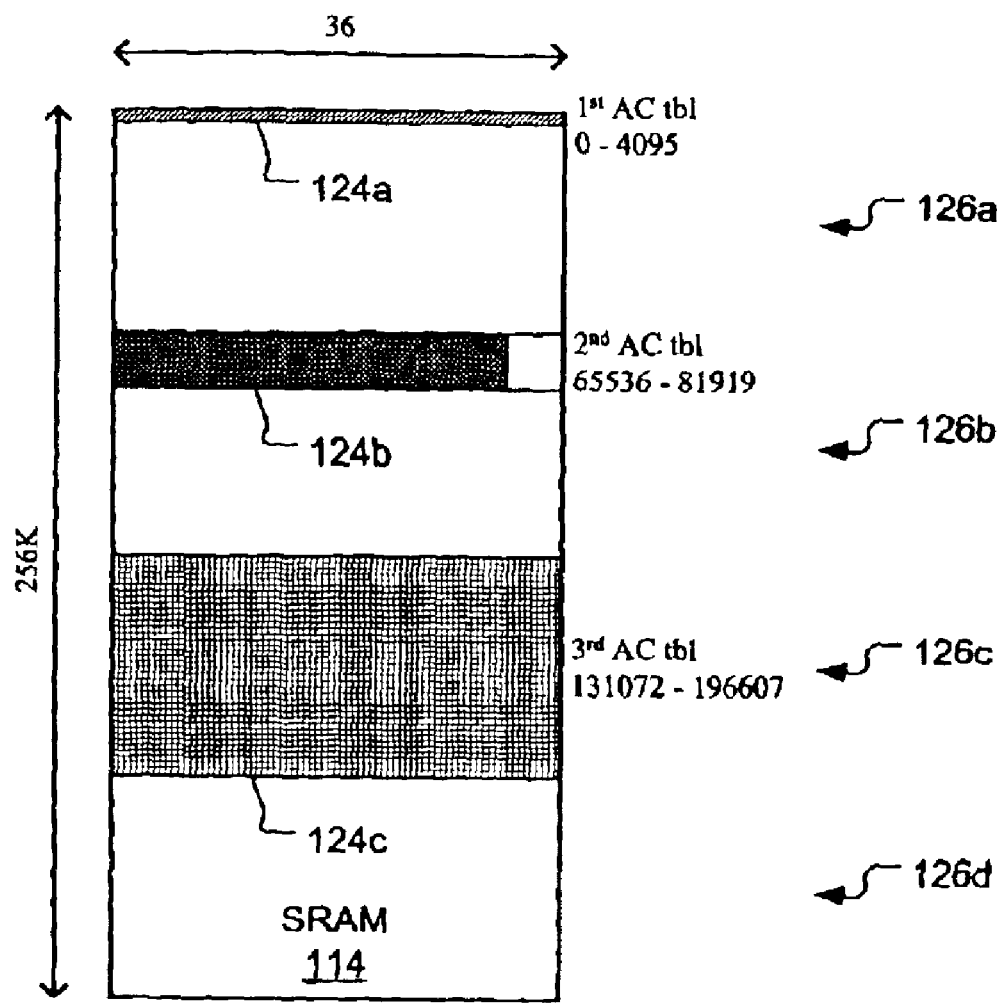
FIG. 5 is a block diagram depicting storage of AC tables in the SRAM of FIG. 3.

FIG. 5 is a block diagram depicting one manner of storing the AC tables 124a–c in the SRAM 114 of FIG. 3. The AC tables 124a–c here are stored in separate quadrants 126a–d within the SRAM 114. In this example, each of the quadrants 126a–d has an equal size of 64K×36, with the AC tables 124a–c stored in the corresponding quadrants 126a–c, and leaving the fourth quadrant 126d unused. Of course, quadrants need not be used. A more complex search engine might use octants or still more regions, for example. FIG. 5 also shows the records in the AC tables 124a–c as having different widths, specifically of 36 bits, 32 bits, and 36 bits. This is discussed presently, with respect to FIG. 9–10.

Figure 6A:
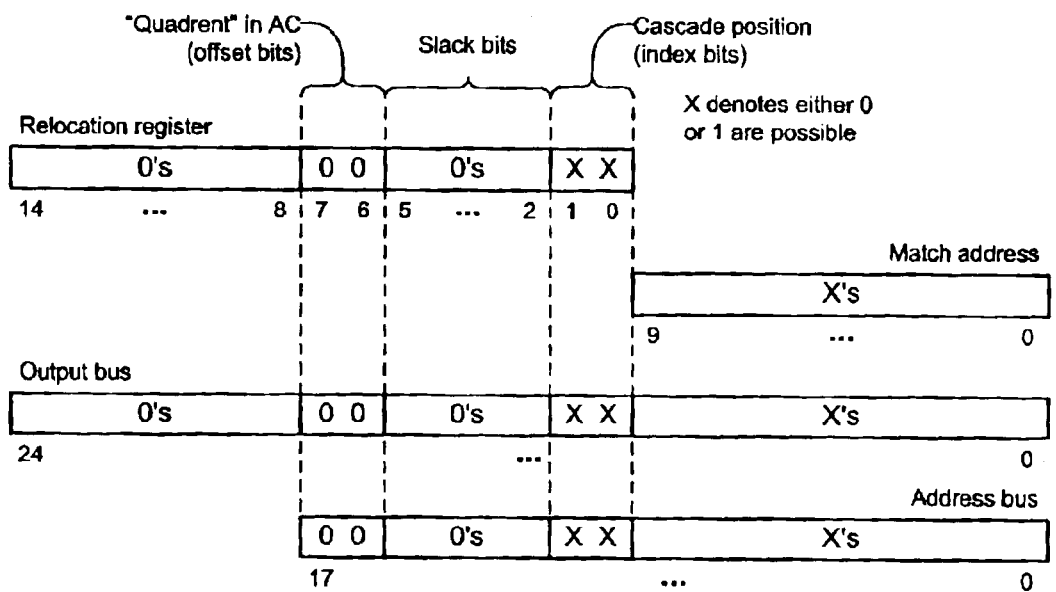
Figure 6B:
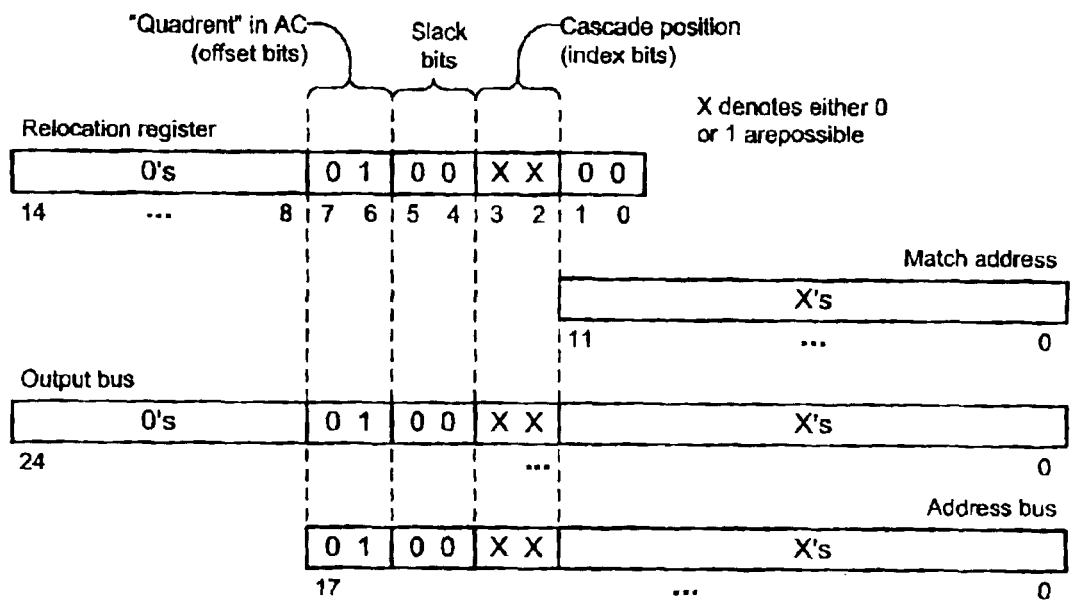
Figure 6C:
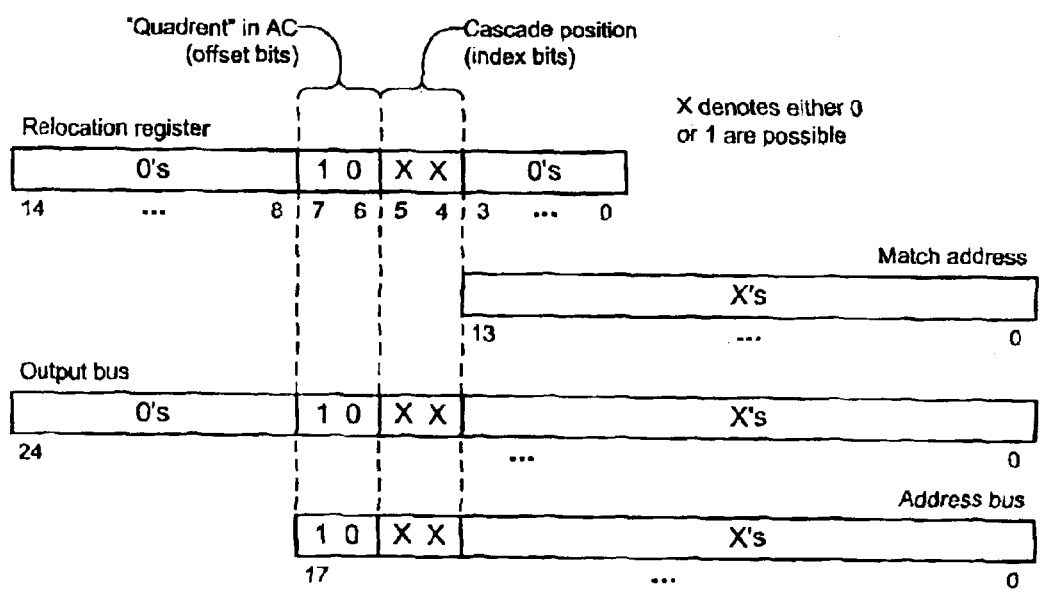

FIG. 6a–c illustrate a suitable process for content address construction in the relocation system 100 just discussed with respect to FIG. 3–5. Briefly, the goal here is to calculate a relocation value in a relocation register that can be added to a match value to produce the content address for a corresponding record in the AC tables 124a–c. Since the smallest match value used here is 10 bits in length, the relocation registers 122a–c should be at least 15 bits in length to fill the 25-bit output bus 116 being used. How the contents of the relocation registers 122a–c are selected and added to the match values, and how that then provides the content address on the 18-bit address bus 118 are what is now discussed.

With reference again briefly to FIG. 5, it can be seen that the quadrants 126a–d in the 256K×32 SRAM 114 here are equal of size. Consequently, the two MSB of an 18-bit address permit selecting the respective quadrants 126a–d. For instance, to access the records in the third AC table 124c these two bits (which we term "offset bits") are set to "10" so they indicate the third quadrant 126c. Other bits in the 18-bit address we wish to construct are termed "index bits" and "slack bits."

FIG. 6a shows the register and bus contents when the first lookup table 120a is used to generate an address in the first AC table 124a in the SRAM 114. As already noted, the 10-bit match values here will represent only the 1K of entries in a single part of the table, and there are four respective such 1K parts stored in the SE devices 112a–d in the cascade in FIG. 3. To specify which SE device 112a–d a match value came from, two additional bits, specifically the index bits, are appended to the front of the match value. For the first lookup table 120a, the index bits are bits 1:0 in the relocation register 122a. Since the first AC table 124a occupies only the lowest 4K of the first quadrant 126a of the SRAM 114, bits 5:2 in the relocation register 122a are slack bits that are set to "00." To specify that the first AC table 124a is in the first quadrant 126a, the offset bits in the relocation register 122a, bits 7:6 here, are set to "00." The remaining bits, bits 14:8 in the relocation register 122a are all set to "0."

So, if a search is invoked on the first lookup table 120a and the highest priority match is in SE device 112c, the index bits are set to "10." And since the first lookup table 120a corresponds to the first AC table 124a and it is in the first quadrant 126a of the SRAM 114, the offset bits are set to "00." The content of the relocation register 122a therefore becomes "000000000000010." If the match value for this search is "1111100000," for example, this is "added" to produce a content address of "000000101111100000."

FIG. 6b shows the register and bus contents when the second lookup table 120b is used to generate an address in the second AC table 124b. The 12-bit match values here will represent only the 4K of entries in a single part of the second lookup table 120b, and there are four such 4K parts. To specify which of the SE devices 112a–d a match value corresponds with, two index bits are now appended to the front of the 12-bit match value. Unlike the case for FIG. 6a, however, the match value and the relocation register 122b here partially overlap. To handle this, bits 1:0 in the relocation register 122b are set to "00," so their later addition has no effect. The index bits are now bits 3:2. Since the second AC table 124b occupies only the lowest 16K of the second quadrant 126b, bits 5:4 in the relocation register 122b are now slack bits that are set to "00." To specify that the second AC table 124b is in the second quadrant 126b, the offset bits (bits 7:6 in the relocation register 122b) are set to "01." Finally, the remaining bits in the relocation register 122b, bits 14:8, are all set to "0."

FIG. 6c shows the register and bus contents when the third lookup table 120c is used to generate an address in the third AC table 124c. The 14-bit match values here represents only the 16K of entries in a single part of the third lookup table 120c. To specify which of the four parts is the source of a match, and thus the location in the third AC table 124c corresponding to that part, two index bits are appended to the front of the 14-bit match values. As was the case for FIG. 6b, but now even more so, the match value and the relocation register 122c overlap. To handle this, bits 3:0 in the relocation register 122c are set to "0000" and the index bits are bits 5:4. Since the third AC table 124c occupies all of the third quadrant 126c, there are no slack bits now. To specify which quadrant the third AC table 124c is in, the offset bits (bits 7:6) now are set to "10." Finally, bits 14:8 are again all set to "0."

Figure 7:
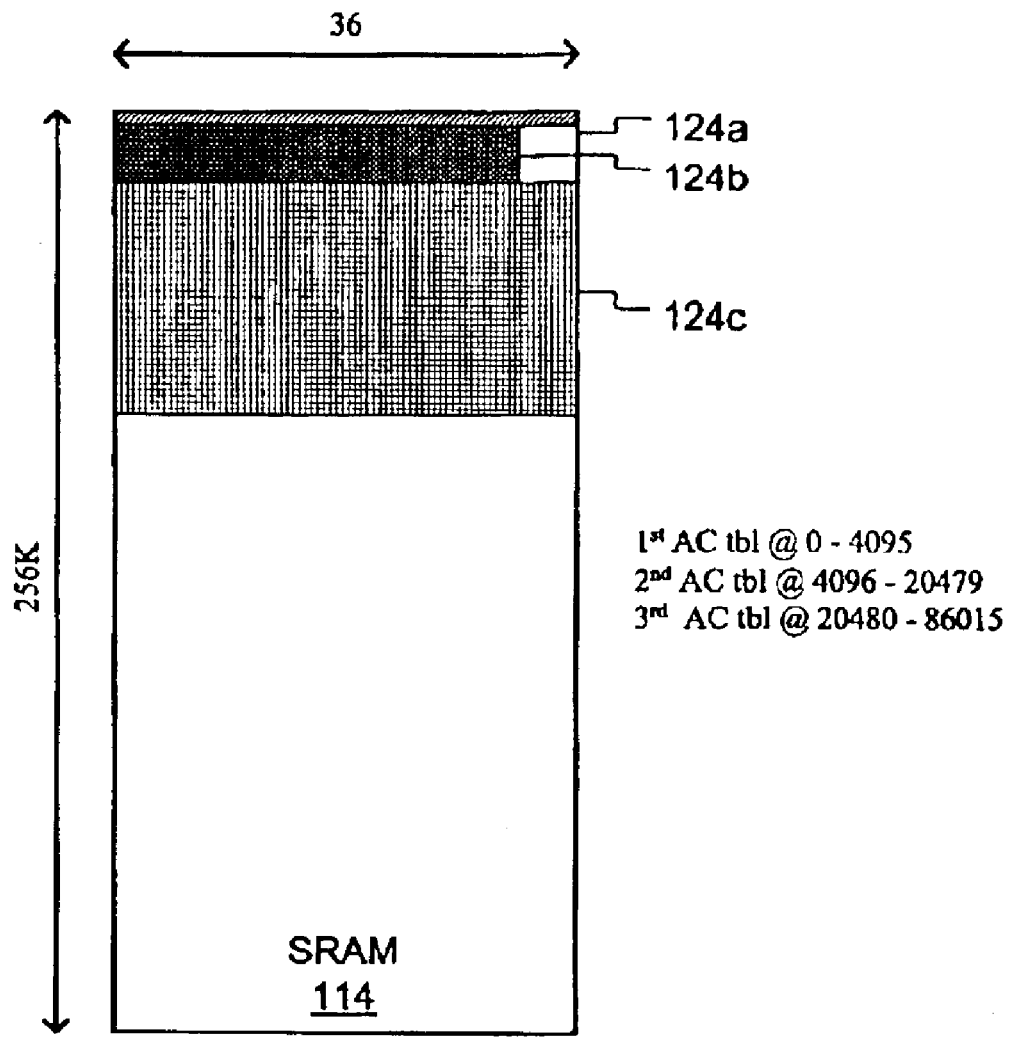
FIG. 7 is a block diagram depicting another manner of storing the AC tables in the SRAM of FIG. 3.

FIG. 7 is a block diagram depicting another manner of storing the AC tables 124a–c in the SRAM 114 of FIG. 3. As can be seen, the AC tables 124a–c are now placed adjacent, sequentially, and starting at the lowest address in the SRAM 114. None of these, however, is a requirement. In this example, the relocation values for the first AC table 124a are simply the same as those in FIG. 6a. For the second AC table 124b and the third AC table 124c, however, other relocation values are needed.

FIG. 8 is a table showing register contents to achieve the storage arrangement depicted in FIG. 7. Deriving the relocation values is now discussed. From the size of the first AC table 124a, we know that the lowest 4K in the SRAM 114 is allocated. To avoid this region an offset value (O) of 4K ("1000000000000") can be added to the 12-bit match values that the second lookup table 120b provides. Recall, however, that only the 15 MSB of the 25-bit content addresses are stored in the relocation register 122b here. Accordingly, one way of viewing this is as the actual value used in the relocation register 122b being O/K, where K is a "minimum relocation increment"("100" here).

Identifying the portions of the second AC table 124b that are associated with the respective parts of the second lookup table 120b in the cascaded SE device 112a–d also needs to accounted for. The value representing this is an "index value"(I). The SE devices 112a–d can be ordinally numbered 0–3, i.e., as chips or memory banks conventionally are numbered, so it follows that the index value can be found by using the formula I=N*S, wherein N is the device number and S is the size of the portions of the table the devices each hold. Again, however, the relocation registers 122a–c here only provide the 15 MSB of the 25-bit content addresses that ultimately is put onto the output bus 116. Accordingly, the values used here are "0," "100," "1000," and "1100" (i.e., I/K).

Thus, for the part of the second lookup table 120b in SE device 112a, no index value is needed (i.e., an index value of "0" is used). For the part in SE device 112b, an index value of 4K ("1000000000000") is needed. For the part in SE device 112c, an index value of 8K ("10000000000000") is needed. And for the part in SE device 112d, an index value of 12K ("1000000000000") is needed.

Putting all of this together, the content of a relocation register 122a–c can be defined according to the formula: (O/K)+(I/K)=(O+I)/K=(O+N*S)/K. Furthermore, this formula works generically for all of the AC tables 124a–c. In our present example, K="10000000000"(1K) and N ranges from 0 to 3. For the first AC table 124a, O=0 and S=1K; for the second AC table 124b, O=4K and S=4K; and for the third AC table 124c, O=20K (4K+16K) and S=16K. It is now a simple matter to calculate the relocation values in the table in FIG. 8.

Summarizing, the offset value represents the respective lookup table being worked with, and implicitly also the database which that lookup table is part of. The index value represents the respective search engine device where a portion of a lookup table is stored, wherein each such device may store portions of multiple lookup tables (e.g., for multiple databases). There can be two degenerate cases. When there is only one database, and thus only one lookup table, there will be only one offset value. That offset value can be zero, but that is not necessarily a requirement. Such a single database can still be stored in multiple, cascaded search engine devices, each represented by a different index value. Also, only one search engine device can be present and then there will be only one index value. That index value can be also zero, but that also is not necessarily a requirement. Such a single search engine device can still store multiple databases, each represented by a different offset value.

Figure 9:
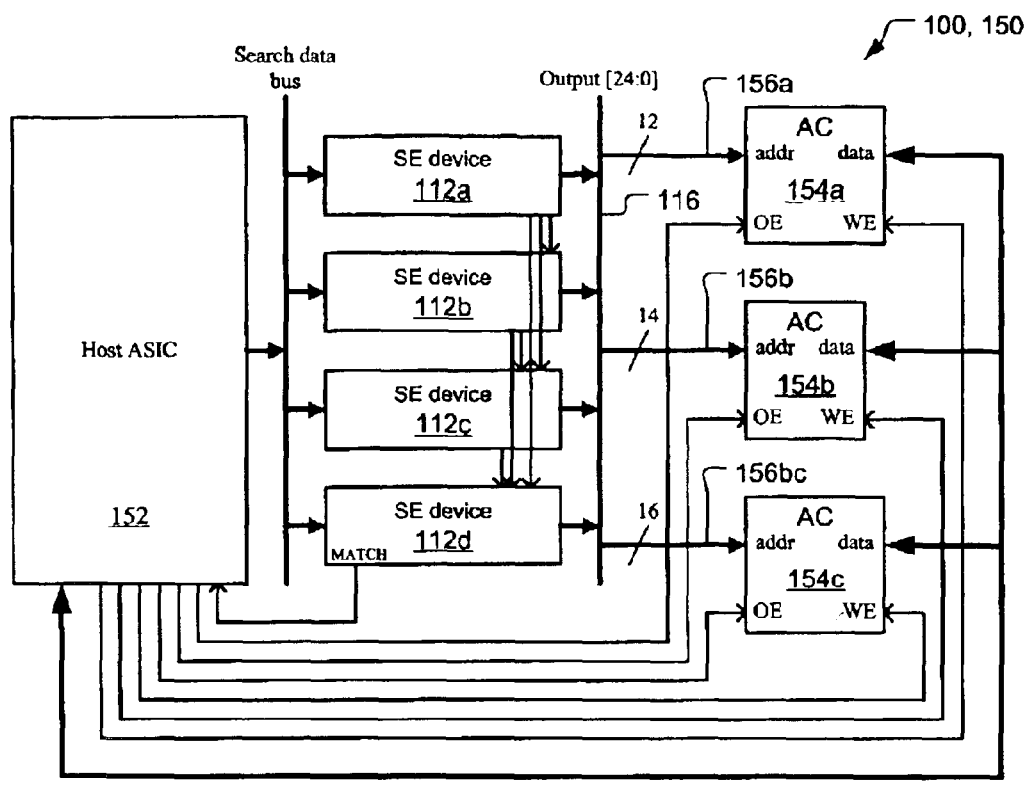
FIG. 9 is a schematic diagram showing a CAM-based search engine according to the inventive relocation system that has a processor controlling access to records stored in multiple SRAMs.

FIG. 9 is a schematic diagram showing the relocation system 100 in a CAM-based search engine 150 that has a processor 152 that controls access to records stored in multiple AC memory devices (SRAMs 154a–c). For the sake of example, the search engine 150 uses the same four cascaded search engine devices (SE devices 112a–d) connected with the same common 25-bit wide output bus 116. The SRAMs 154a–c have different address buses 156a–c, respectively having 12-bit, 14–bit, and 16-bit widths. The same three lookup tables 120a–c (FIG. 4) are again stored in CAM type memory in the SE devices 112a–d, and the AC tables 124a–c are essentially the same, but now stored respectively in the SRAMs 154a–c.

FIGS. 5, 7, and 9 also illustrate another situation. The width of AC records will often vary from database to database, depending upon the particular application being supported. These figures depict the "width" of the first AC table 124a in SRAM 154a and the third AC table 124c in SRAM 154c as both being 36 bits, but the width of the second AC table 124b in SRAM 154b as being only 32 bits. In this situation, using one AC memory device (e.g., one chip like the SRAM 114) to store all of the records forces the system designer to size the chip according to the widest records. When the AC records are significantly different in size, it may be more practical and cost effective to use several AC memory devices that are more closely matched to the differing widths of the AC records.

Figure 10:
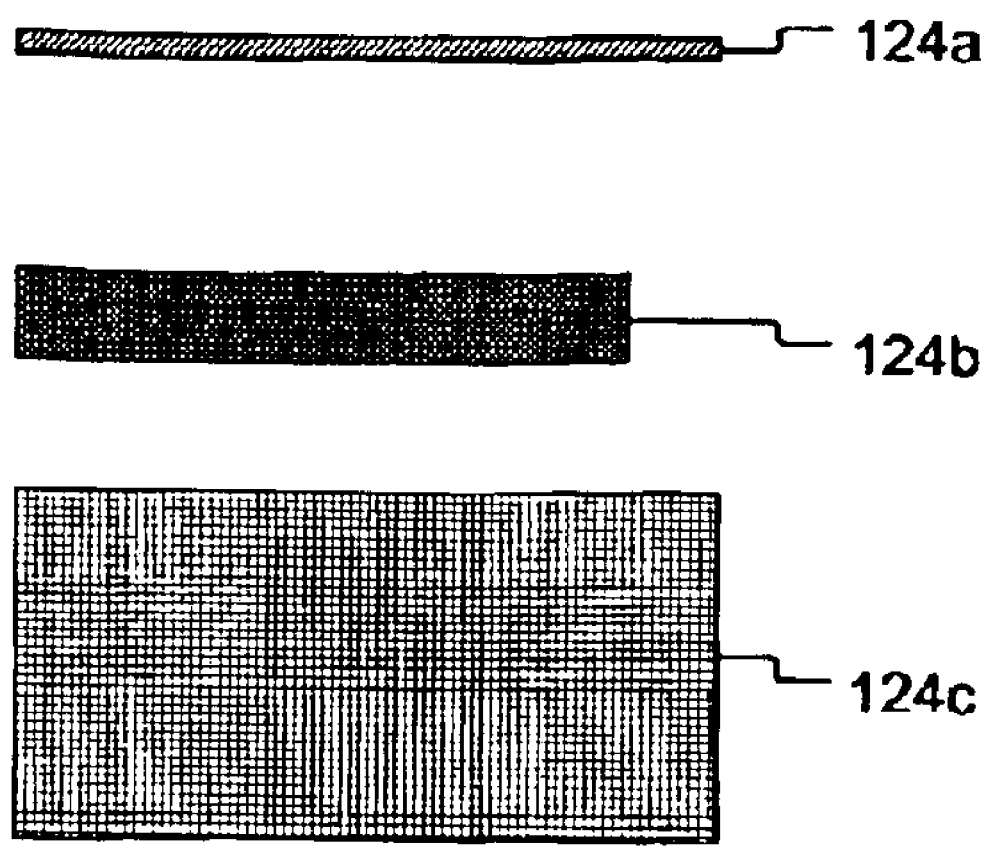
FIG. 10 is a block diagram stylistically depicting the AC tables stored in the multiple SRAMs of FIG. 9.

FIG. 10 is a block diagram stylistically depicting the AC tables 124a–c stored in the respective SRAMs 154a–c. As can be seen with comparison to FIG. 5 and 7, the approach shown in FIGS. 9 and 10 more effectively uses the AC memory devices. The databases still share the same output bus 116, however, now that their associated content records reside in the different SRAMs 154a–c, the offset value (O) is no longer a concern. A relocation value can now simply be defined according to the formula N*S/K (where K is the minimum relocation increment value, N is the respective SE device 112a–d number, and S is the respective lookup table portion size that a SE device 112a–d holds). With reference to FIG. 6a–c, with four devices in the cascade we still need to append an additional two bits to the match address, but bits [7:6] will now always be "00" since moving across quadrants is no longer a concern.

A system designer here can just tap the necessary signals from the 25-bit output bus 116 to connect the SRAMs 154a–c for each individual database. A host ASIC (the processor 152) can control the output enable (OE) and write enable (WE) signals of the individual SRAMs 154a–c, since it will know the database for the current operation. Alternatively, the same bits in the relocation registers 122a–c that were otherwise used in prior examples herein, to relocate the content address across quadrants within an associated content memory device, can now be used to drive a chip select circuit. This permits the output bus to automatically indicate the associated content memory device corresponding to a search hit.

Figure 11:
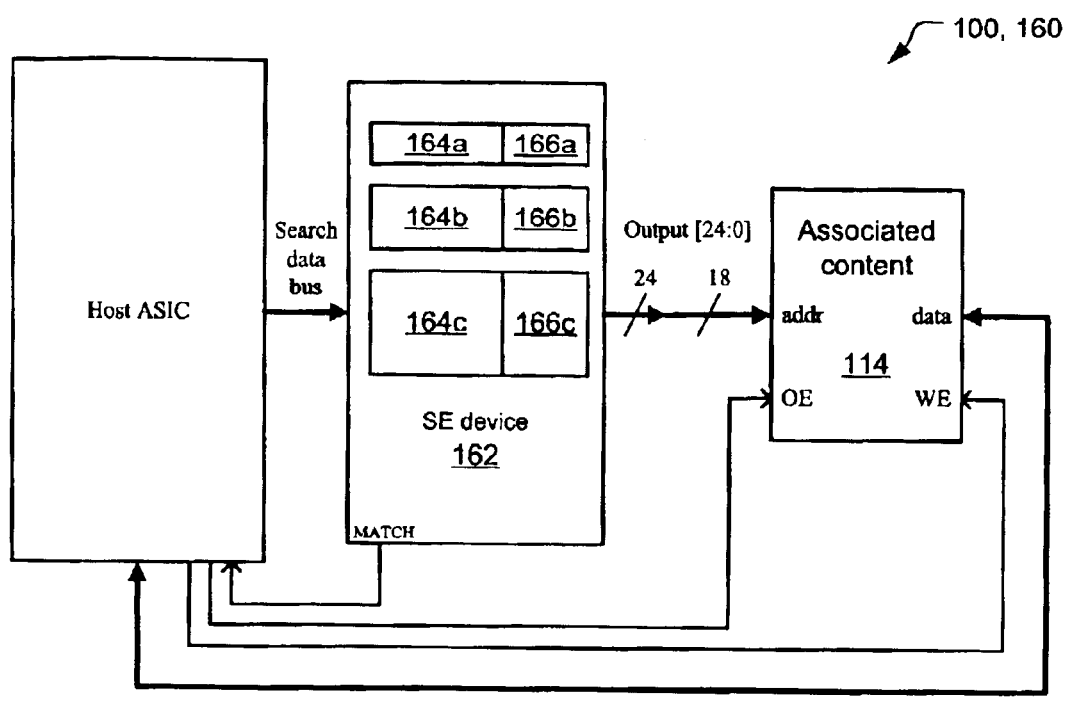
FIG. 11 is a schematic diagram showing a CAM-based search engine according to the inventive relocation system that has a single search engine device and a single addressable memory.

FIG. 11 is a schematic diagram showing the inventive relocation system 100 in an a single CAM-based search engine 160 that has a single search engine device (SE device 162) and a single addressable memory (SRAM 114, again). For three databases, three lookup tables 164a–c and corresponding relocation registers 166a–c are provided in the SE device 162, and three associated content tables (AC tables 124a–c; FIGS. 5 and 7) are provided in the SRAM 114. As can be readily appreciated, the search engine 160 here can handle the same databases as the search engine 110 (FIG. 3) does, storing the AC tables 124a–c in either of the manners depicted in FIGS. 5 and 7.

Figure 12:
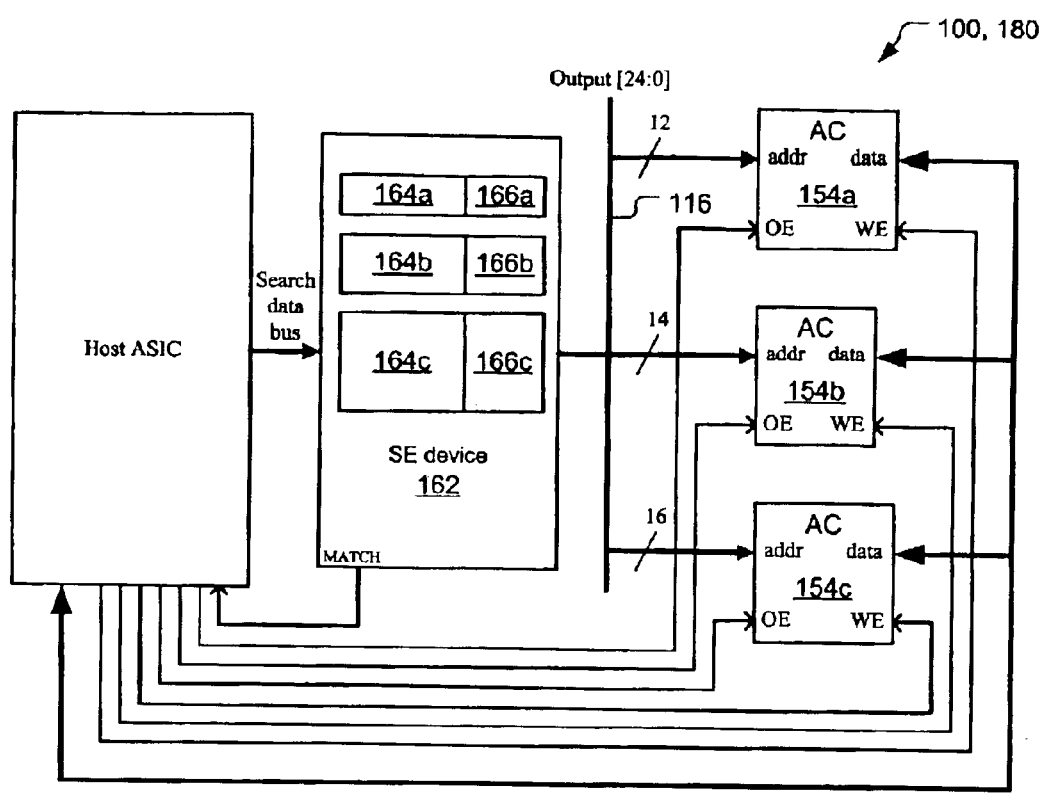
FIG. 12 is a schematic diagram showing a CAM-based search engine according to the inventive relocation system that has a single search engine device and multiple addressable memories.

FIG. 12 is a schematic diagram showing the inventive relocation system 100 in an a single CAM-based search engine 180 that has a single search engine device (SE device 162, again) and multiple addressable memories (SRAMs 154a–c, again). The same three databases in FIG. 11 are used here, with the lookup tables 164a–c and corresponding relocation registers 166a–c in the SE device 162, but the three associated content tables (AC tables 124a–c) are now in the SRAMs 154a–c. As can be readily appreciated, the search engine 180 here operates much as the search engine 150 (FIG. 9) does, storing the AC tables 124a–c in the manner depicted in FIG. 10.

Figure 13:
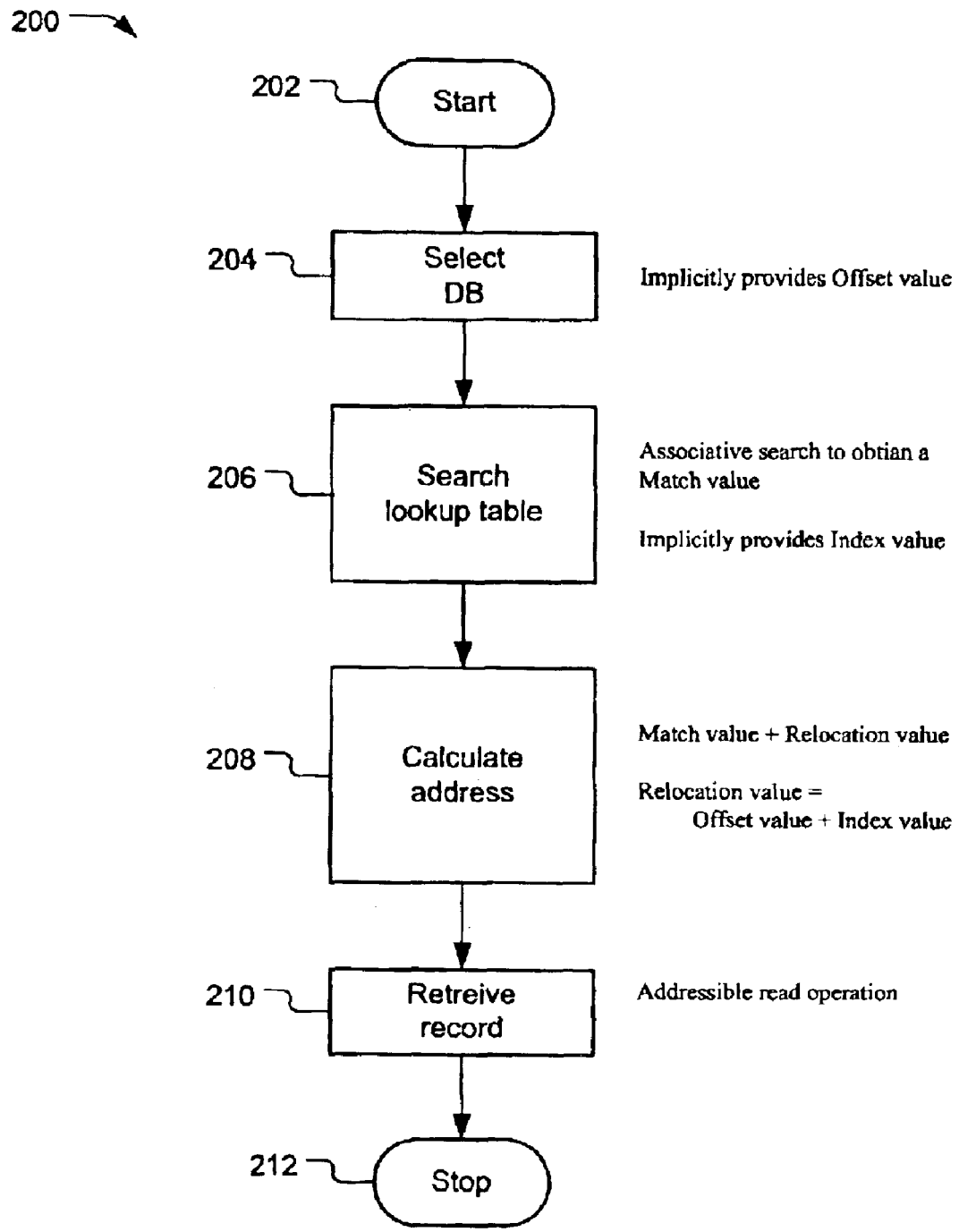
FIG. 13 is a flow chart showing a generalized method by which one in a plurality of pre-stored databases may be searched.

FIG. 13 is a flow chart showing a generalized method 200 by which one in a plurality of pre-stored databases may be searched. In a step 202, the generalized method 200 starts. Initialization operations, etc., if desired, may be performed here.

In a step 204, the particular database to be searched is selected. This inherently selects a corresponding lookup table and a corresponding associate content table.

In a step 206, the selected lookup table is associatively searched using a search key and a match value is obtained, if possible. That is, each of the selected lookup table's respective sections, potentially residing in the different search engines, is searched for match values. If no matches are found, there is no match value. If multiple matches are found, one is selected to be the match value.

In a step 208, an address is calculated based on the match value, the offset value for the section of the selected lookup table from which the match value was obtained, and the index value for the selected associate content table. As has been described above, this can be done by calculating a relocation value based on the index and offset values, and combining that with the match address. As has also been described above, respective relocation values for each section of each lookup table can be pre-calculated and stored in relocation registers for this very purpose. There are a number of straightforward variations that can be employed here with respect to when and how the elements of the address are calculated. Note, if matches were found in different search engines, in step 206, a cascade arrangement, such as those shown in FIGS. 3 and 9, permits one match to be used. This step can be suppressed for all but one match, or it can be carried out for all of the matches and only one result then chosen to be the address.

In a step 210, the address is used to retrieve a record in the database that becomes the search result. Finally, in a step 212, the generalized method 200 stops. Termination operations, etc., if desired, may be performed here.

Generalizing a method for storing a database, such as that which the generalized method 200 of FIG. 13 searches, follows from the concepts discussed above. Designers can "work forward" from their applications, implementing the relocation system 100 in custom designed hardware to accommodate their database needs. More typically, however, designers will "work backward," applying the relocation system 100 with largely standardized hardware. The inventive relocation system 100 particularly facilitates this with its ability to flexibly locate the databases across multiple search engines and one or many addressable memories. In fact, with its relocation register based approach, the inventive relocation system 100 can easily be scaled as database storage needs change. Within an existing embodiment, databases can be relocated to more fully utilize the available total capacity. Alternately, embodiments can have hardware elements added or removed to dynamically enlarge or shrink the capacity, and existing databases can be migrated into this or additional ones can be added.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present relocation system 100 is well suited for application in hardware-based database storage and retrieval. As has been described herein, it facilitates high speed bifurcated database searching, wherein associative memory (e.g., CAM) is efficiently used for storing associatively searchable lookup tables and addressable memory (e.g., RAM or ROM) is particularly efficiently used for storing addressably searchable associate content tables. As associative and addressable memory differ substantially in both search speed and cost, the invention balances these often competing factors.

The invention permits a flexible ability to cascade search engine devices and maintain low pin count, component footprint, and host processor management burden. Yet its novel use of relocation values permits even more efficient use of the addressable memory than previous schemes. The use of relocation values for search engine devices and sections of search engine devices permits mapping associate content tables efficiently within a single addressable memory or among multiple addressable memories. Additionally, the relocation values can be pre-calculated, for instance at system initialization, and stored in relocation registers for rapid later use without burdening the host processor or system.

The invention also permits a powerful ability to store multiple databases and execute multiple, simultaneous lookups per cycle, dynamically choosing which database should be searched in a given cycle, choosing which output database should be searched, and properly locating the appropriate record for that database.

Furthermore, the invention permits other improvement in this field. For example, a search processor can be made up not only of CAM-based search engines, but also algorithmic search engines. Such systems can choose the lookup mechanism used, either CAM-based or algorithm based, on-the-fly, depending on a lookup request and its characteristics. The diverse search mechanisms, however, still represent the same database lookup table or tables, so the respective addresses for associated content still need to be merged. Thus, here as well, the invention can be expanded to flexibly and powerfully allow multiple lookup mechanisms, multiple databases, and multiple cascaded devices, to share the same lookup unit output port and associated content address space.

For the above, and other, reasons, it is expected that the relocation system 100 of the present invention will have widespread industrial applicability. Therefore, it is expected that the commercial utility of the present invention will be extensive and long lasting.

What is claimed is:

1. A search engine for storing entries in lookup tables wherein the entries are usable to access corresponding records in associate content tables stored in addressable memory, comprising:

an associative memory suitable to store one or more of the lookup tables;

a search logic suitable to receive and associatively match a search key against the entries of one of the lookup tables to determine a match value, when possible;

an address logic suitable to calculate an address in the addressable memory for the record in the associate content table corresponding to the entry for which said match value is determined; and said address logic further suitable to define relocation values, one or more per associative memory, and add a said relocation value for the associative memory for which a said match value is determined to said match value when calculating said address.

2. The search engine of claim 1, wherein:

said associative memory has a plurality of sections each suitable to store a sub-set of the entries in one of the lookup tables; and said address logic is further suitable to define said relocation values for each said section of said associative memory, and use a said relocation value for a said section of the associative memory for which a said match value is determined when calculating said address.

3. The search engine of claim 1, wherein said address logic includes relocation registers suitable to store said relocation values, thereby permitting said relocation values to be defined and stored before a said match value is determined.

4. The search engine of claim 1, wherein said address logic defines each said relocation value based on an index value and an offset value, wherein said index value is determined based on ordinality for said associative memory and said offset value is determined based on ordinality for said sections of said associative memory.

5. The search engine of claim 1, wherein said address logic calculates said address to have a greater number of digits than necessary to access the addressable memory, thereby permitting a system employing the search engine to use less than all of said digits in said address as an actual address in the addressable memory.

6. The search engine of claim 1, further comprising a cascade logic suitable to communicate with others in a plurality of the search engines such that said address is calculated in one of said plurality of the search engines.

7. A system for database storage as a lookup table of entries and an associated content table of records, comprising:
a processor suitable to provide a search key and receive a search result;
one or more search engines collectively suitable for storing the lookup table, wherein each said search engine has an associative memory having one or more sections and each said section defines an offset value and each said search engine defines an index value;
an addressable memory suitable to addressably store the associate content table;
said search engines each further suitable to receive said search key, to associatively search the lookup table based on said search key, to determine a match value, when possible, and to calculate an address based on said match value, and said offset value and said index value; and
said addressable memory further suitable to receive said address, to retrieve one of the records in the associate content table, and to communicate said one of the records to said processor as said search result.

8. The system of claim 7, wherein:
said search engines have a cascade bus suitable to communicate with others of said plurality of search engines;
said search engines are able to choose one said match value from among a plurality of said match matches in multiple of said search engines based on a pre-specified priority scheme; and
each said search engine is suitable to suppress outputting a said address unless it is the source of said one said match value.

9. The system of claim 7, wherein:
said search engines are suitable for storing a plurality of associative tables, wherein the lookup table is one of said plurality of associative tables; and
said addressable memory is suitable for storing a plurality of addressable tables, wherein the associate content table is one of said plurality of addressable tables.

10. The system of claim 7, wherein said addressable memory is a single unit.

11. The system of claim 7, wherein said addressable memory is a plurality of different units each suitable for storing at least one of a plurality of the associate content tables.

12. The system of claim 7, wherein:
each said section of each said search engine has a relocation register suitable to store a relocation value based on a said offset value and a said index value; and
each said search engine is suitable to calculate said address based on a said match value and said a relocation value.

13. The system of claim 12, wherein:
said addressable memory is a plurality of different units each suitable for storing one of a plurality of the associate content tables; and
said search engines are each further suitable to calculate said address based on said relocation values to select a respective one of said plurality of the associate content tables.

14. A method for storing an entry to access a corresponding record stored in addressable memory, the method comprising the steps of:
(a) providing one or more associative memories each having one or more sections, wherein more than one said associative memory is present when each has only one said section and more than one said section is present when only one said associative memory is provided;
(b) selecting one of said associative memories as a current associative memory and one of said sections in said current associative memory as a current section;
(c) determining a current relocation value for said current section in said current associative memory; and
(d) storing the entry at a location in said current section in said current associative memory such that said location defines a match value, wherein the sum of said match value and said current relocation value specifies an address suitable for storing the record in the addressable memory.

15. The method of claim 14, further comprising:
prior to said step (b), defining an offset value for each said section and defining an index value for each said associative memory and calculating a plurality of relocation values, one for each said section of each said associative memory; and
wherein said step (c) includes:
selecting said current relocation value from said plurality of relocation values.

16. A method for searching a lookup table with a search key to determine an address for a corresponding record stored in addressable memory, wherein:
the lookup table contains a plurality of entries stored in one or more sections of one or more associative memories; and
each of the sections defines an offset value and each of the associative memories defines an index value; and
the method comprising the steps of:
(a) associatively searching the sections in which the lookup table is stored with the search key such that a match value is obtained, when possible; and
(b) calculating the address based on said match value, the offset value for the section from which said match value was obtained, and the index value for the associative memory from which said match value was obtained.

17. The method of claim 16, wherein said step (a) includes choosing said match value based on a pre-specified priority scheme from among a plurality of said match values obtained in the sections.

18. The method of claim 16, further comprising:

prior to said step (a), calculating relocation values for each of the sections of each of the associative memories based on the respective offset values and the respective index values; and wherein said step (b) includes:

calculating said address based on said match value and said relocation value for the section of the associative memory from which said match value was obtained.

19. A system for storing an entry to access a corresponding record stored in addressable memory, the system comprising:

means for providing one or more associative memories each having one or more sections, wherein more than one said associative memory is present when each has only one said section and more than one said section is present when only one said associative memory is provided;

means for selecting one of said associative memories as a current associative memory and one said sections in said current associative memory as a current section;

means for determining a current relocation value for said current section in said current associative memory; and means for storing the entry at a location in said current section in said current associative memory such that said location defines a match value, wherein the sum of said match value and said current relocation value specifies an address suitable for storing the record in the addressable memory.

20. A system for searching a lookup table with a search key to determine an address for a corresponding record stored in addressable memory, wherein:

the lookup table contains a plurality of entries stored in one or more sections of one or more associative memories; and each of the sections defines an offset value and each of the associative memories defines an index value; and the system comprising:

means for associatively searching the sections in which the lookup table is stored with the search key such that a match value is obtained, when possible; and means for calculating the address based on said match value, the offset value for the section from which said match value was obtained, and the index value for the associative memory from which said match value was obtained.

* * * * *